(12) United States Patent
Borgogni et al.

(10) Patent No.: US 10,277,109 B2
(45) Date of Patent: Apr. 30, 2019

(54) MULTI-CHANNEL INVERTER FOR A PHOTOVOLTAIC APPARATUS

(71) Applicant: ABB Schweiz AG, Baden (CH)

(72) Inventors: Marco Borgogni, San Giovanni Valdarno (IT); Sauro Macerini, Frazione Levane (IT); Massimo Garufi, Salerno (IT)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/814,149

(22) Filed: Nov. 15, 2017

(65) Prior Publication Data

US 2018/0167027 A1    Jun. 14, 2018

(30) Foreign Application Priority Data

Nov. 15, 2016    (EP) .................................... 16198831

(51) Int. Cl.
*H02M 1/12* (2006.01)
*H02J 3/38* (2006.01)
*H02M 1/00* (2006.01)

(52) U.S. Cl.
CPC ............. *H02M 1/126* (2013.01); *H02J 3/383* (2013.01); *H02M 2001/0077* (2013.01); *H02M 2001/123* (2013.01); *Y02E 10/563* (2013.01)

(58) Field of Classification Search
CPC ........ H02M 1/12; H02M 1/126; H02M 7/493; H02M 2001/0077; H02M 2001/12
See application file for complete search history.

(56) References Cited

U.S. PATENT DOCUMENTS

| 2012/0140363 | A1* | 6/2012 | Jeppe | ................... | H02H 7/1222 |
| | | | | | 361/18 |
| 2013/0141950 | A1 | 6/2013 | Xiao et al. | | |
| 2013/0242623 | A1 | 9/2013 | Wei et al. | | |
| 2015/0222170 | A1 | 8/2015 | Berger et al. | | |
| 2015/0244259 | A1* | 8/2015 | Kaiser | ................... | H02M 3/158 |
| | | | | | 307/9.1 |
| 2016/0079888 | A1* | 3/2016 | Li | .......................... | H02P 6/002 |
| | | | | | 318/400.3 |
| 2016/0226398 | A1 | 8/2016 | Macerini et al. | | |
| 2017/0288575 | A1* | 10/2017 | Kitada | .................. | H02M 1/126 |

OTHER PUBLICATIONS

European Patent Office, Extended Search Report issued in corresponding Application No. 16198831.6 dated May 26, 2017, 6 pp.

* cited by examiner

*Primary Examiner* — Kyle J Moody
(74) *Attorney, Agent, or Firm* — J. Bruce Schelkopf; Taft Stettinius & Hollister LLP (57) ABSTRACT

An inverter for a photovoltaic apparatus, said inverter comprising a DC electric bus having a plurality of electric lines forming corresponding DC input channels for said inverter. The inverter comprises a choke filter comprising a single magnetic circuit and a plurality of choke windings enchained with said magnetic circuit. Said choke windings are electrically connected in series with corresponding line conductors of said electric lines, which have a same voltage polarity. Said choke windings are arranged so that AC electric currents flowing along said choke windings generate magnetic fluxes having concordant directions. In a further aspect, the invention relates also to a choke filter for a DC electric bus of a photovoltaic apparatus.

10 Claims, 8 Drawing Sheets

MULTI-CHANNEL INVERTER FOR A PHOTOVOLTAIC APPARATUS

The present invention relates to a multi-channel inverter for a photovoltaic apparatus.

Multi-channel inverters are widely used in photovoltaic apparatuses comprising multiple strings or photovoltaic panels.

A multi-channel inverter typically comprises a DC electric bus, which electrically connects the photovoltaic panels with a DC/AC conversion stage of the inverter.

Such a DC electric bus normally includes a plurality of electric lines, each of which forms a corresponding DC input channel of the inverter, which is operatively coupled with the DC/AC conversion stage.

In operation, DC currents, which are generated by the photovoltaic panels, flow along the DC electric bus towards the DC/AC conversion stage.

As is known, however, said DC currents are overlapped with differential-mode AC currents, which substantially are disturbances with a well-defined spectral content generated by the electric or electronic components of the inverter and, more generally, of the photovoltaic apparatus (e.g. the photovoltaic panels).

Even if regulations do not currently impose severe limits to this kind of disturbances, it is quite advisable to reduce or avoid the introduction of current noise at the DC section of the photovoltaic apparatus.

In fact, such noise may remarkably affect operation of ancillary devices of the photovoltaic apparatus such as optimizers, rapid shut-down devices and, above, arc fault detection devices, thereby leading to undesired and unnecessary interruptions of the operation of the photovoltaic apparatus itself.

For this reason, some currently available multi-channel inverters include choke filter arrangements to suppress or reduce said differential-mode currents flowing along the DC electric bus.

Unfortunately, choke filters currently adopted in multi-channel inverters have a cumbersome structure, which is often difficult to integrate circuitally with the DC electric bus and, possibly, with the other components of the inverter with a consequent increase of the overall occupied volumes.

Finally, these conventional filter arrangements are relatively expensive to manufacture and install at industrial level.

The main aim of the present invention is to provide a multi-channel inverter for a photovoltaic apparatus, which enables the disadvantages described above to be overcome.

Within this aim, another object of the present invention is to provide a multi-channel inverter, in which differential-mode AC currents flowing along the DC electric bus are suppressed or remarkably reduced.

Another object of the present invention is to provide a multi-channel inverter, which has a compact structure with a relatively small size.

Yet another object of the present invention is to provide a multi-channel inverter, which is easy and inexpensive to produce at industrial level.

This aim and these objects, together with other objects that will be more apparent from the subsequent description and from the accompanying drawings, are achieved, according to the invention, by an inverter, according to claim 1 and the related dependent claims.

In a general definition, the inverter, according to the invention, comprises a DC electric bus having a plurality of electric lines forming corresponding DC input channels for said inverter. Each electric line comprises a pair of line conductors adapted to operate at opposite voltage polarities.

The inverter, according to the invention, comprises a choke filter having a single magnetic circuit and a plurality of choke windings enchained with said single magnetic circuit so as to be magnetically coupled one to another.

The choke windings of said choke filter are electrically connected in series with corresponding line conductors of said electric lines, which have a same voltage polarity.

Said choke windings have first terminals electrically coupled with upstream portions of said corresponding line conductors and second terminals electrically coupled with a corresponding common electric node, which is in turn electrically coupled with downstream portions of said corresponding line conductors (reference is made to the main direction of the generated power flow, i.e. from the photovoltaic panels to the inverter).

Said choke windings are arranged so that AC electric currents flowing along said choke windings generate magnetic fluxes having concordant directions.

Preferably, said choke filter comprises a single magnetic core around which said choke windings are wound. Said single magnetic core forms the single magnetic circuit of said choke filter.

According to some embodiments of the invention, said choke windings are electrically connected in series with corresponding line conductors adapted to operate at a positive voltage polarity.

According to other embodiments of the invention, said choke windings are electrically connected in series with corresponding line conductors adapted to operate at a negative voltage polarity.

In a further aspect, the present invention relates to a choke filter, according to the following claim 9.

In a general definition, the choke filter of the invention is adapted for being electrically coupled to a DC electric bus of a photovoltaic apparatus.

The choke filter comprises a single magnetic circuit and a plurality of choke windings enchained with said single magnetic circuit.

The choke windings of said choke filter are electrically connectable in series with corresponding line conductors of the electric lines of the DC electric bus, which have a same voltage polarity.

Said choke windings have first terminals electrically coupleable with upstream portions of said corresponding line conductors and second terminals electrically coupled with a corresponding common electric node, which is in turn electrically coupleable with downstream portions of said corresponding line conductors.

Said choke windings are arranged so that electric currents flowing along said choke windings generate magnetic fluxes having concordant directions.

Preferably, the choke filter of the invention comprises a single magnetic core around which said choke windings are wound.

In the choke filter of the invention, the choke windings may be electrically connectable in series with corresponding line conductors adapted to operate at a positive voltage polarity or with corresponding line conductors adapted to operate at a negative voltage polarity.

Further characteristics and advantages of the present invention will be more apparent with reference to the description given below and to the accompanying figures, provided purely for explanatory and non-limiting purposes, wherein.

With reference to the aforesaid figures, the present invention relates to an inverter 1 for a low voltage photovoltaic apparatus 100.

For the sake of clarity, it is specified that the term "low voltage" refers to operating voltages lower than 1 kV AC and 1.5 kV DC.

Figure 1:
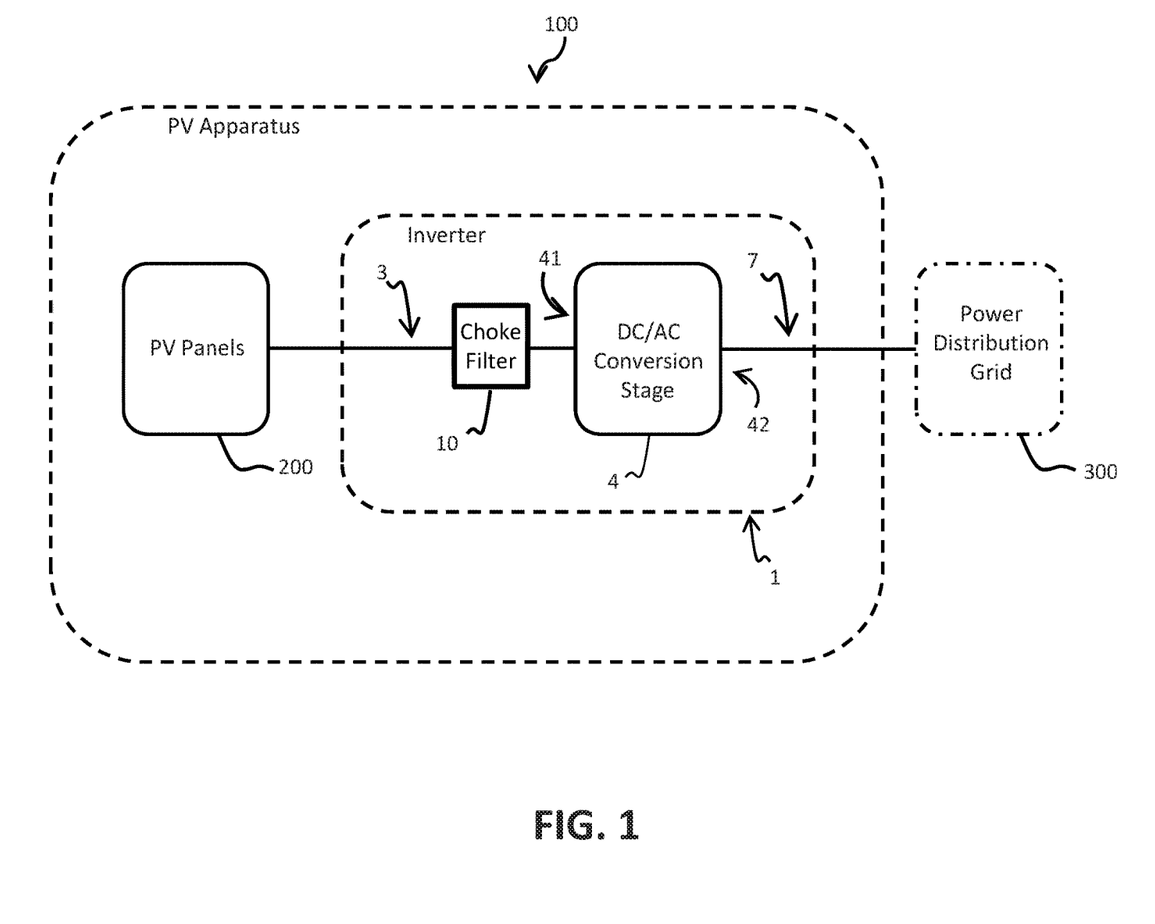
FIG. 1 schematically illustrates a photovoltaic apparatus including an inverter, according to the present invention.

Referring now to FIG. 1, the photovoltaic apparatus 100 comprises one or more photovoltaic panels 200 and an inverter 1 having an DC/AC conversion stage 4.

The inverter 1 comprises a DC electric bus 3, which is electrically connected with the photovoltaic panels 200 and a DC input port 41 of the conversion stage 4.

Conveniently, the inverter 1 comprises an AC electric bus 7, which is electrically connected with the electric power distribution grid 300 and an AC output port 42 of the conversion stage 4.

The DC electric bus 3 has a plurality of DC electric lines $L_1, \ldots, L_N$ (N>1) that electrically connect the photovoltaic panels 200 with the DC/AC conversion stage 4.

The electric lines $L_1, \ldots, L_N$ are advantageously adapted to form corresponding DC input channels for the inverter 1, each of which provides a DC current to the DC/AC conversion stage 4.

The inverter 1 is thus of the multi-channel type.

Preferably, the inverter 1 is operated in such a way that the electric lines $L_1, \ldots, L_N$ form corresponding interleaved DC input channels.

Preferably, the DC/AC conversion stage 4 is capable of carrying out MPPT (Maximum Power Point Tracking) functionalities for each DC input channel.

In order to allow the flow of DC electric currents from the photovoltaic panels 200 to the DC/ACS conversion stage 4, each electric line $L_1, \ldots, L_N$ of the DC electric bus 3 comprises at least a pair of line conductors $C_1, C_2$ having opposite voltage polarities.

As an example, each electric line $L_1, \ldots, L_N$ may comprise a first line conductor $C_1$ with a positive voltage polarity (e.g. forming the supply conductor of the electric line) and a second line conductor $C_2$ with a negative voltage polarity (e.g. forming the return conductor of the electric line).

The DC electric bus 3 will thus have N (N>1) line conductors $C_1$ having a positive voltage polarity and N line conductors $C_2$ having a negative voltage polarity.

The line conductors $C_1, C_2$ of each electric line $L_1, \ldots, L_N$ have corresponding upstream portions $C_{1U}, C_{2U}$, which are electrically coupled (in parallel one with respect to the other) with the photovoltaic panels 200, and corresponding downstream portions $C_{1D}, C_{2D}$, which are electrically coupled (in parallel one with respect to the other) with the conversion stage 4 of the inverter 1.

As it will better emerge from the following, the upstream portions $C_{1U}, C_{2U}$ and the downstream portions $C_{1D}, C_{2D}$ of the conductors $C_1, C_2$ of each electric line $L_1, L_N$ are arranged in such a way to ensure the electrical continuity between the photovoltaic panels 200 and the conversion stage 4 of the inverter 1.

According to the invention, a choke filter 10 is operatively associated with the conductors $C_1, C_2$ of the electric lines $L_1, \ldots, L_N$.

As it will better emerge from the following, the choke filter 10 is operatively associated with the conductors $C_1$ or $C_2$ of the electric lines $L_1, \ldots, L_N$, which have a same voltage polarity (e.g. positive or negative).

According to preferred embodiments of the invention (as shown in the cited figures), the choke filter 10 is included in the inverter 1.

However, according to alternative embodiments of the invention (not shown), the choke filter 10 may be arranged externally to the inverter 1 and be operatively associated to a portion of the DC electric bus 3 external to the outer case of the inverter.

The choke filter 10 comprises a single magnetic circuit 2 and a plurality of choke windings $W_1, \ldots, W_N$ (N>1) enchained with said magnetic circuit.

In this way, the choke windings $W_1, \ldots, W_N$ are magnetically coupled one to another and the magnetic fluxes generated by AC currents flowing along said choke windings magnetically interact one with another.

Preferably, the choke filter 10 comprises a magnetic core (e.g. formed by one or more shaped pieces of magnetic material) that forms the single magnetic circuit 2. In this case, the choke windings $W_1, \ldots, W_N$ are advantageously wound around said magnetic core.

As an alternative, the choke filter 10 comprises a non-magnetic core (e.g. formed by one or more shaped pieces of non-magnetic material) that forms the single magnetic circuit 2. In this case, the choke windings $W_1, \ldots, W_N$ are advantageously wound around said non-magnetic core.

As a further alternative, the single magnetic circuit 2 may be formed by a magnetic flux path fully realized in air. In this case, the choke windings $W_1, \ldots, W_N$ are advantageously are arranged so as to be enchained with said magnetic path.

The choke filter 10 comprises a choke winding $W_1, \ldots, W_N$ for each electric line $L_1, \ldots, L_N$.

The choke windings $W_1, \ldots, W_N$ of the choke filter 10 are electrically connected in series with corresponding line conductors $C_1, C_2$ of the electric lines $L_1, \ldots, L_N$, which have a same voltage polarity.

In other words, each choke winding $W_1, \ldots, W_N$ is electrically connected in series with a line conductor $C_1$ (FIG. 4) or with a line conductor $C_2$ (FIGS. 2-3, 5) of a corresponding electric line $L_1, \ldots, L_N$.

The choke filter 10 is thus electrically coupled with the line conductors $C_1$ having a positive voltage polarity or with the line conductors $C_2$ having a negative voltage polarity and will therefore have N (N>1) choke windings $W_1, \ldots, W_N$, namely a choke winding for each electric line as stated above.

Conveniently, the choke windings $W_1, \ldots, W_N$ have first terminals $W_{11}, \ldots, W_{N1}$ and second terminals $W_{12}, \ldots, W_{N2}$, preferably arranged at their opposite ends.

Figure 4:
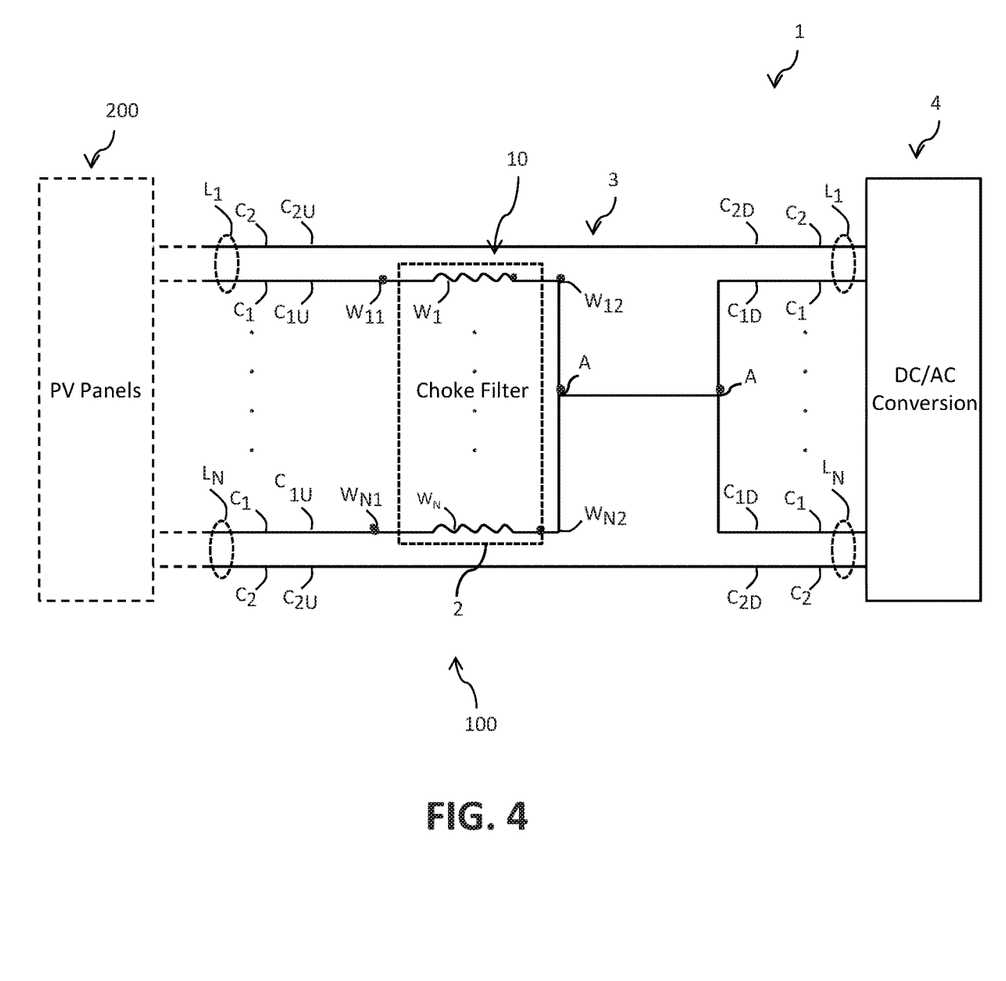

If the choke winding $W_1, \ldots, W_N$ are electrically connected in series with the corresponding line conductors $C_1$ with a positive voltage polarity, the first terminals $W_{11}, \ldots, W_{N1}$ are electrically coupled with the upstream portions $C_{1U}$ of the line conductors $C_1$ whereas the second terminals $W_{12}, \ldots, W_{N2}$ are electrically coupled with a corresponding first common electric node A, which is in turn electrically coupled with the downstream portions $C_{1D}$ of the line conductors $C_1$ (FIG. 4).

The downstream portions $C_{1D}$ of the line conductors $C_1$ are electrically connected (in parallel one with respect to another) with the common electric node A and the conversion stage 4 (or another intermediate stage). They may thus be physically formed, at least partially, by a common line conductor electrically connected with the common electric node A and the conversion stage 4 (or another intermediate stage).

As to the upstream portions $C_{2U}$ and the downstream portions $C_{2D}$ of the line conductors $C_2$ with a negative voltage polarity, they are electrically connected in series to ensure the electrical continuity of the line conductors $C_2$.

Figure 2:
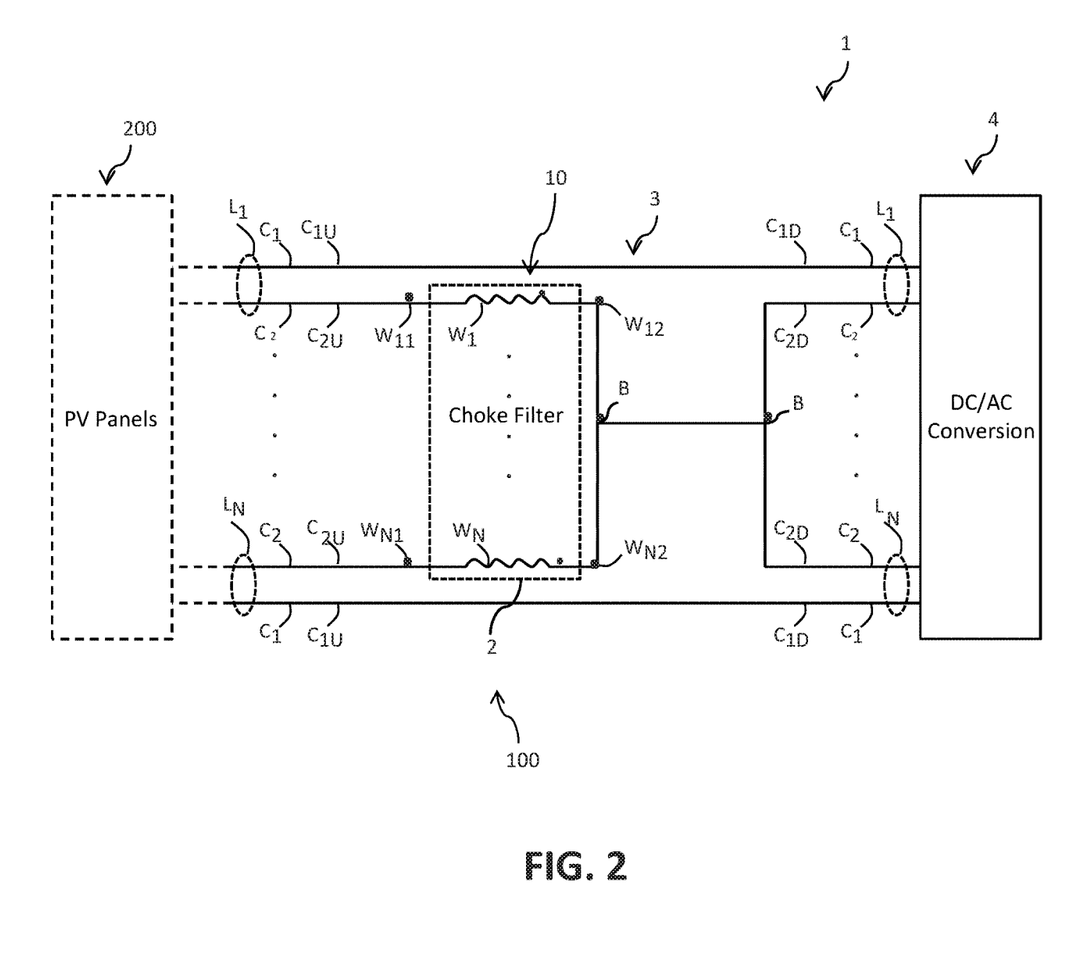
FIGS. 2-8 schematically illustrate a choke filter operatively coupled to a DC electric bus in some possible embodiments of the inverter, according to the present invention.
Figure 3:
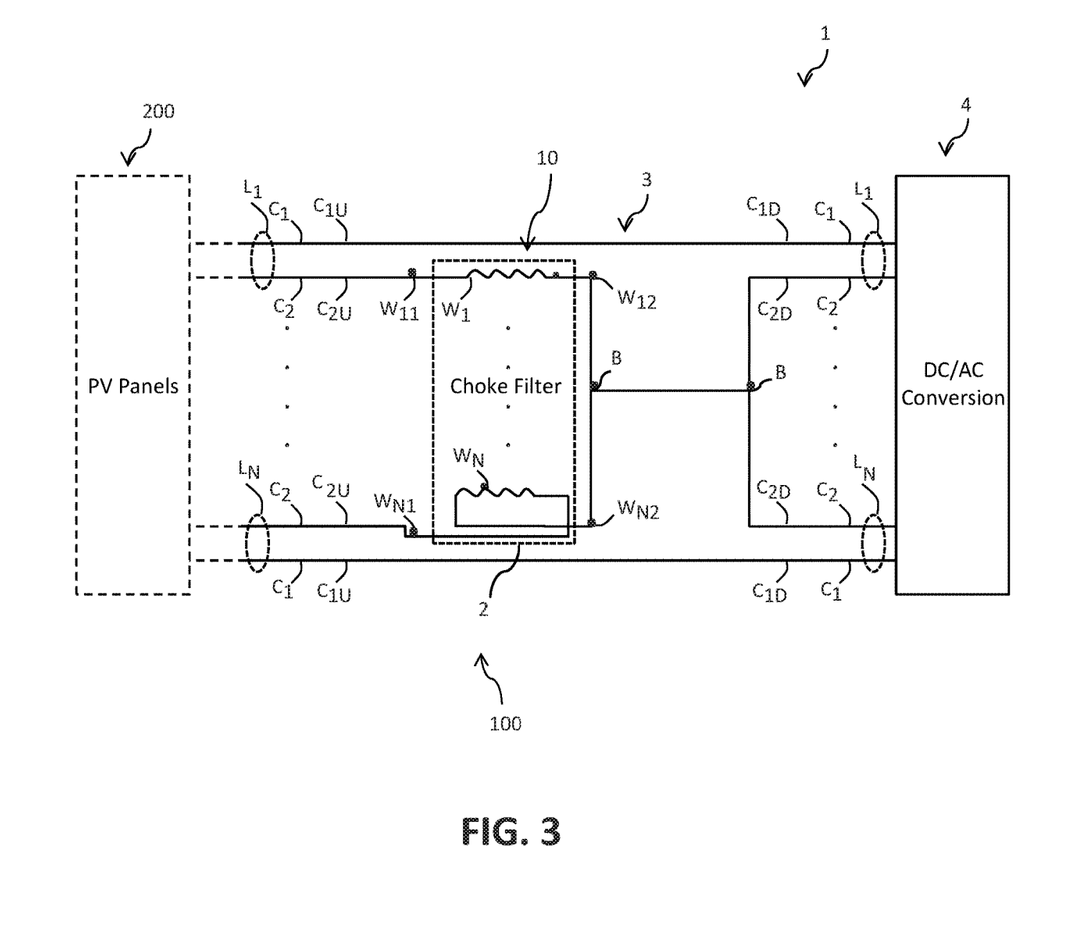
Figure 5:
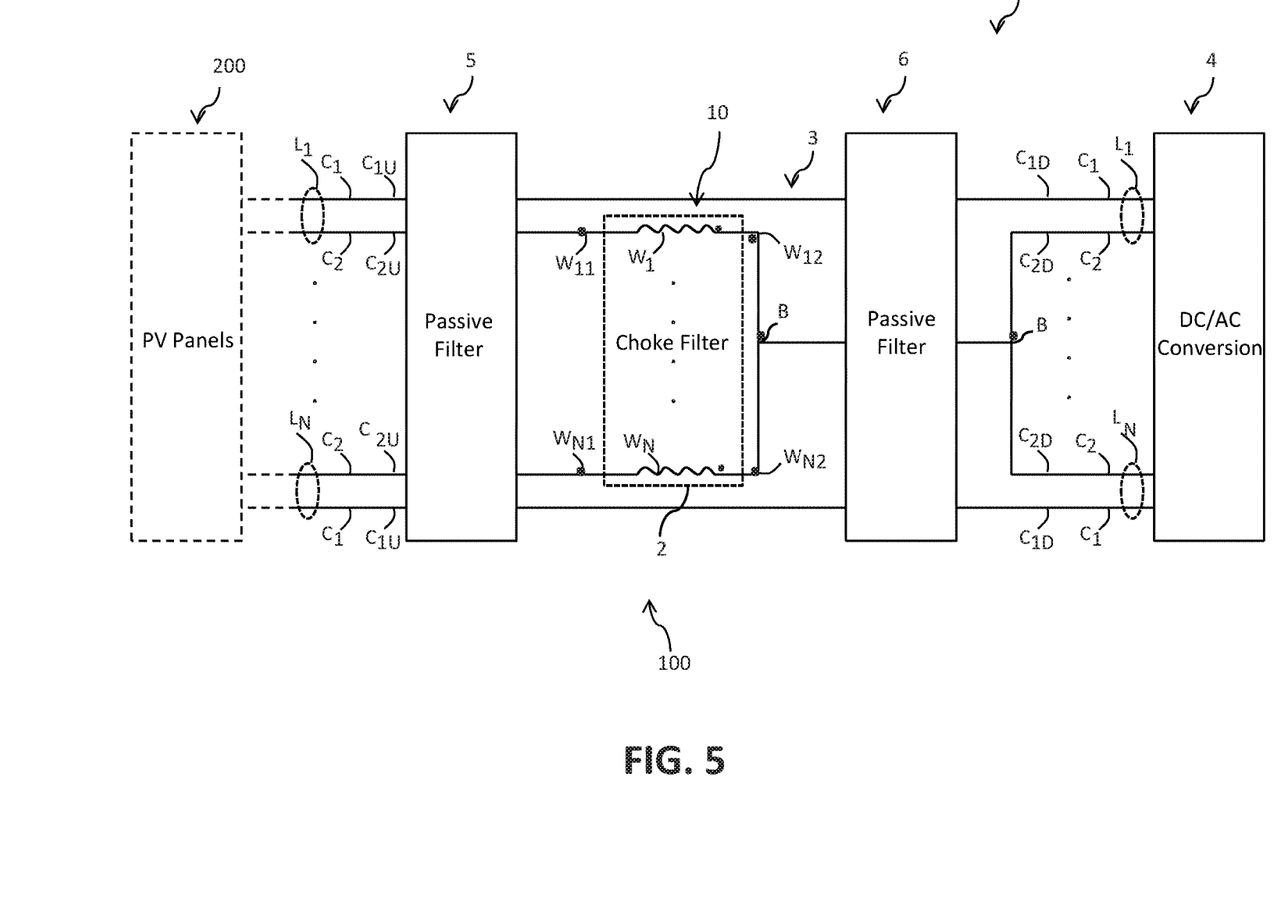

If the choke winding $W_1, \ldots, W_N$ are electrically connected in series with the corresponding line conductors $C_2$ with a negative voltage polarity, the first terminals $W_{11}, \ldots, W_{N1}$ are electrically coupled with the upstream portions $C_{2U}$ of the line conductors $C_2$ whereas the second terminals $W_{12}, \ldots, W_{N2}$ are electrically coupled with a corresponding second common electric node B, which is in turn electrically coupled with the downstream portions $C_{2D}$ of the line conductors $C_2$ (FIGS. 2-3, 5).

The downstream portions $C_{2D}$ of the line conductors $C_2$ are electrically connected (in parallel one with respect to another) between common electric node B and the conversion stage 4 (or another intermediate stage). They may be physically formed, at least partially, by a common line conductor electrically connected with the common electric node B and the conversion stage 4 (or another intermediate stage).

As to the upstream portions $C_{1U}$ and the downstream portions $C_{1D}$ of the line conductors $C_1$ with a positive voltage polarity, they are electrically connected in series to ensure the electrical continuity of the line conductors $C_1$.

The choke windings $W_1, \ldots, W_N$ of the choke filter 10 are conveniently arranged (i.e. electrically connected in series with the line conductors C1 or C2 and wound around the single magnetic circuit 2 of the choke filter 10) in such a way that possible AC electric currents flowing along said choke windings generate magnetic fluxes having concordant directions.

In other words, the choke windings $W_1, \ldots, W_N$ are arranged in such a way to have a same sign correlation between the direction of the AC currents flowing along them and their winding direction.

As an example, the choke windings $W_1, \ldots, W_N$ may be arranged so that the AC currents flowing along said choke windings have concordant directions and the winding directions of said choke windings are concordant (FIGS. 2, 4, 5).

As a further example, the choke windings $W_1, \ldots, W_N$ may arranged so that the AC currents flowing along said choke windings have opposite directions and the winding directions of said choke windings are opposite (FIG. 3).

Thanks to the original configuration described above, which provides for carrying out filtering only at the supply conductors or at the return conductors of the electric lines $L_1, \ldots, L_N$, the choke filter 10 allows effectively filtering possible differential-mode AC currents flowing along said electric lines with a smaller number of choke windings $W_1, \ldots, W_N$ with respect to the traditional solutions of the state of the art.

The choke filter 10 thus provides relevant advantages in terms of size reduction and integration capabilities.

In a practical implementation of the invention, the choke filter 10 and at least a portion of the DC electric bus 3 may be advantageously realized on a PCB support, e.g. on a control board of the inverter 1.

This solution greatly facilitates the structural integration of the choke filter 10 and of the DC electric bus 3 with components or parts of the inverter 1 without a substantial increase of the occupied volumes.

In FIGS. 2-5, exemplary embodiments of the invention are shown, in which the DC electric bus 2 comprises N electric lines $L_1, \ldots, L_N$ (N>1).

In these cases, the choke filter 10 comprises a single magnetic circuit 2 with N (N>1) enchained choke windings $W_1, \ldots, W_N$.

In the embodiment of FIG. 2, the choke windings $W_1, \ldots, W_N$ are electrically connected in series with corresponding line conductors $C_2$ with a negative voltage polarity.

The choke windings $W_1, \ldots, W_N$ have first terminals $W_{11}, \ldots, W_{N1}$ electrically coupled with corresponding upstream portions $C_{2U}$ of the line conductors $C_2$ with a negative voltage polarity and second terminals $W_{12}, \ldots, W_{N2}$ electrically coupled with a corresponding common electric node B, which is electrically connected in series with downstream portions $C_{2D}$ of the line conductors $C_2$ with a negative voltage polarity.

The upstream portions $C_{1U}$ and the downstream portions $C_{1D}$ of the line conductors $C_1$ with a positive voltage polarity are electrically connected in series.

The choke windings $W_1, \ldots, W_N$ are arranged so that the AC currents flowing along them have concordant directions and the winding directions of said choke windings are concordant.

The embodiment of FIG. 3 is quite similar to the embodiment of FIG. 2.

However, in this case, the choke windings $W_1, \ldots, W_N$ are arranged so that the AC currents flowing along them have opposite directions and the winding directions of these choke windings are opposite.

In the embodiment of FIG. 4, the choke windings $W_1, \ldots, W_N$ of the choke filter 10 are electrically connected in series with corresponding line conductors $C_1$ with a positive voltage polarity.

The choke windings $W_1, \ldots, W_N$ have first terminals $W_{11}, \ldots, W_{N1}$ electrically coupled with corresponding upstream portions $C_{1U}$ of the line conductors $C_1$ with a positive voltage polarity and second terminals $W_{12}, \ldots, W_{N2}$ electrically coupled with a corresponding common electric node A, which is electrically coupled with downstream portions $C_{1D}$ of the line conductors $C_1$ with a positive voltage polarity.

The upstream portions $C_{2U}$ and the downstream portions $C_{2D}$ of the line conductors $C_2$ with a negative voltage polarity are electrically connected in series.

The choke windings $W_1, \ldots, W_N$ are arranged so that the AC currents flowing along them have concordant directions and the winding directions of said choke windings are concordant.

The embodiment of FIG. 5 is quite similar to the embodiment of FIG. 2.

The choke windings $W_1, \ldots, W_N$ are arranged so that the AC currents flowing along them have concordant directions and the winding directions of said choke windings are concordant.

However, in this case, the AC currents flowing along the choke windings $W_1, \ldots, W_N$ have opposite directions with respect to the embodiment of FIG. 2 and the winding direction of said choke windings are opposite with respect to the embodiment of FIG. 2.

According to an aspect of the invention, a first passive filter 5 is preferably electrically coupled with the upstream portions $C_{1U}, C_{2U}$ of the line conductors $C_1, C_2$ of the electric lines $L_1, \ldots, L_N$.

According to a further aspect of the invention, a second passive filter 6 is preferably electrically coupled with the downstream portions $C_{1D}, C_{2D}$ of the line conductors $C_1, C_2$ of the electric lines $L_1, \ldots, L_N$.

According to preferred embodiments of the invention (as shown in FIG. 5), both the passive filters 5, 6 are included in the inverter 1.

However, according to alternative embodiments of the invention (not shown), the passive filters 5, 6 may be arranged externally to the inverter 1 and be operatively associated to a portion of the DC electric bus 3, which is external to the outer case of the inverter.

The passive filters 5, 6 may be of known type and will not be described in further details for the sake of brevity.

In a practical implementation of the invention, even the passive filters 5, 6 may be advantageously realized on a PCB support (e.g. a control board of the inverter 1) together with the choke filter 10 and at least a portion of the DC electric bus 3.

Figure 6:
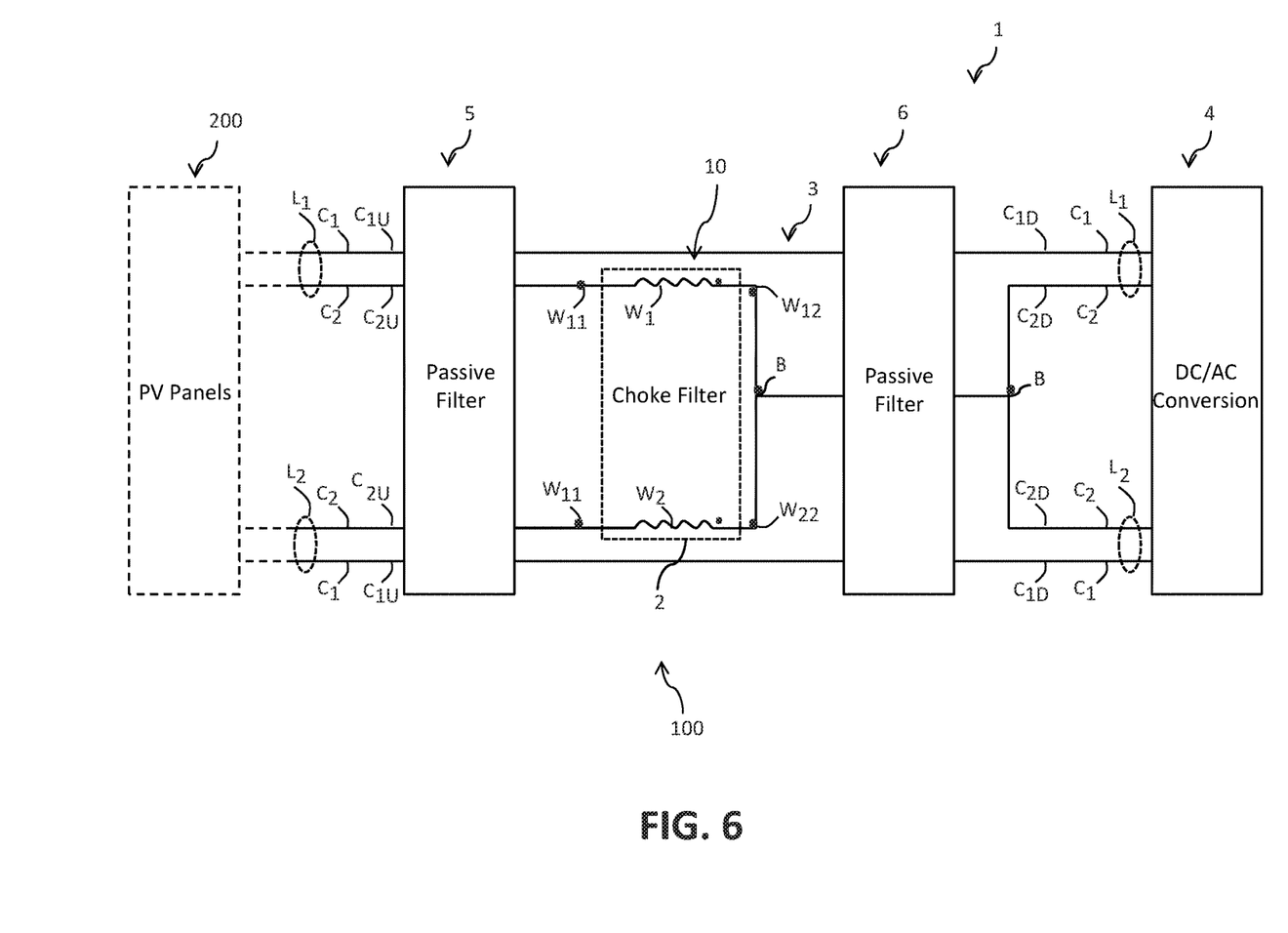
Figure 7:
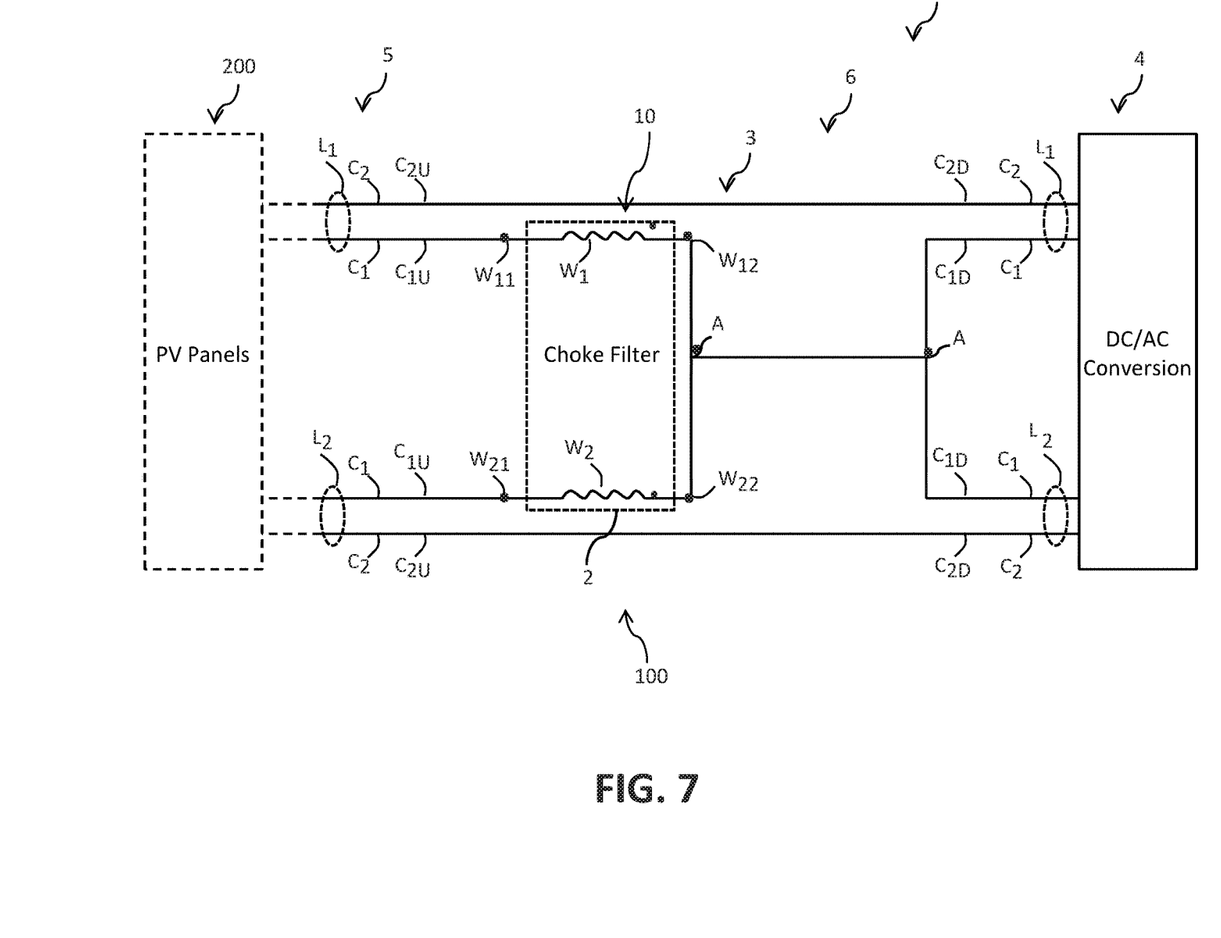
Figure 8:
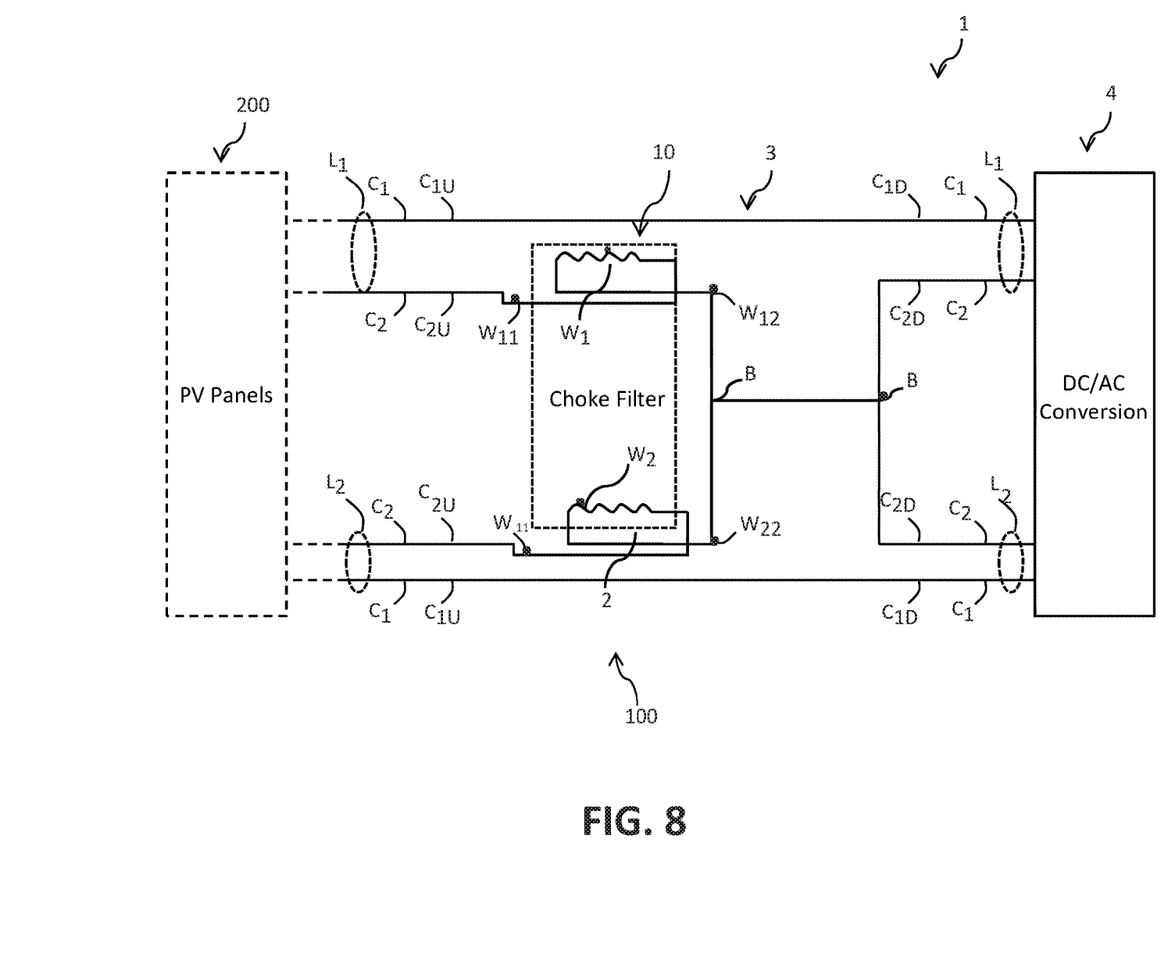

In FIGS. 6-8, further exemplary embodiments of the invention are shown, in which the DC electric bus 2 comprises two electric lines $L_1$, $L_2$ (N=2).

In these cases, the choke filter 10 comprises a single magnetic circuit 2 with two enchained choke windings $W_1$, $W_2$ (N=2).

In the embodiment of FIG. 6 (similar to the embodiment of FIG. 5), the choke windings $W_1$, $W_2$ of the choke filter 10 are electrically connected in series with corresponding line conductors $C_2$ with a negative voltage polarity.

The choke windings $W_1$, $W_2$ have first terminals $W_{11}$, $W_{21}$ electrically coupled with corresponding upstream portions $C_{2U}$ of the line conductors $C_2$ with a negative voltage polarity and second terminals $W_{12}$, $W_{22}$ electrically coupled with a corresponding common electric node B, which is electrically coupled with downstream portions $C_{2D}$ of the line conductors $C_2$ with a negative voltage polarity.

The upstream portions $C_{1U}$ and the downstream portions $C_{1D}$ of the line conductors $C_1$ with a positive voltage polarity are electrically connected in series.

The choke windings $W_1$, $W_2$ are arranged so that the AC currents flowing along them have concordant directions and the winding directions of said choke windings are concordant.

Passive filters 5, 6 are operative coupled with the upstream and downstream portions $C_{1U}$, $C_{2U}$, $C_{1D}$, $C_{2D}$ of the line conductors $C_1$, $C_2$ of the electric lines $L_1$, $L_2$.

In the embodiment of FIG. 7 (similar to the embodiment of FIG. 4), the choke windings $W_1$, $W_2$ of the choke filter 10 are electrically connected in series with corresponding line conductors $C_1$ with a positive voltage polarity.

The choke windings $W_1$, $W_2$ have first terminals $W_{11}$, $W_{21}$ electrically coupled with corresponding upstream portions $C_{1U}$ of the line conductors $C_1$ with a positive voltage polarity and second terminals $W_{12}$, $W_{22}$ electrically coupled with a corresponding common electric node A, which is electrically connected in series with downstream portions $C_{1D}$ of the line conductors $C_1$ with a positive voltage polarity.

The upstream portions $C_{2U}$ and the downstream portions $C_{2D}$ of the line conductors $C_2$ with a negative voltage polarity are electrically connected in series.

The choke windings $W_1$, $W_2$ are arranged so that the AC currents flowing along them have concordant directions and the winding directions of said choke windings are concordant.

In the embodiment of FIG. 8, the choke windings $W_1$, $W_2$ of the choke filter 10 are electrically connected in series with corresponding line conductors $C_2$ with a negative voltage polarity.

The choke windings $W_1$, $W_2$ have first terminals $W_{11}$, $W_{21}$ electrically coupled with corresponding upstream portions $C_{2U}$ of the line conductors $C_2$ with a negative voltage polarity and second terminals $W_{12}$, $W_{22}$ electrically coupled with a corresponding common electric node B, which is electrically coupled with downstream portions $C_{2D}$ of the line conductors $C_2$ with a negative voltage polarity.

The upstream portions $C_{1U}$ and the downstream portions $C_{1D}$ of the line conductors $C_1$ with a positive voltage polarity are electrically connected in series.

The choke windings $W_1$, $W_2$ are arranged so that the AC currents flowing along them have concordant directions and the winding directions of said choke windings are concordant.

However, in this case, the AC currents flowing along the choke windings $W_1$, $W_2$ have opposite directions with respect to the embodiment of FIG. 6 and the winding directions of said choke windings are opposite with respect to the embodiment of FIG. 6.

The present invention allows achieving the intended aims and objects.

The choke filter 10 allows cancelling or remarkably reducing the disturbances, which are induced by the differential mode AC currents flowing along the conductors $C_1$, $C_2$ of the electric lines $W_1$, $W_2$, ..., $W_N$ of the DC current bus 3.

The choke filter 10 allows obtaining high levels of reliability in the operation of the inverter 1 and in the detection of possible arc faults, consequent high levels of immunity to false tripping.

Differently from known solutions of the state of the art, the choke filter 10 has a relatively small number of a choke windings $W_1$, $W_2$, ..., $W_N$ and a single magnetic circuit.

The choke filter 10 has thus a very compact structure, which can be easily manufactured at industrial level on a PCB support with highly automated operations and that can therefore be fully integrated with other parts or components of the inverter 1.

The choke filter 10 therefore provides relevant advantages in terms of size and cost reduction with respect to known solutions of the state of the art.

The invention claimed is:

1. An inverter for a photovoltaic apparatus, said inverter comprising:
    a DC electric bus including: a plurality of electric lines, each electric line comprising a first line conductor having a first voltage polarity and a second line conductor having a second voltage polarity,
    a choke filter including:
        a single magnetic circuit, and
        a plurality of choke windings enchained with said magnetic circuit, each choke winding of the plurality of choke windings including a first terminal and a second terminal, each first terminal of one of the plurality of choke windings being coupled to the first line conductor of one of the plurality of electric lines, each second terminal of the plurality of choke winding being coupled to a common node having the first voltage polarity; and
    a DC input port including:
        a first plurality of terminals, each being coupled the common node, and
        a second plurality of terminals, each being coupled to the first line conductor of one of the first plurality of electric lines.

2. The inverter, according to claim 1, wherein said choke windings are wound around a same magnetic core of said choke filter.

3. The inverter, according to claim 1, wherein the inverter comprises a first passive filter electrically coupled with the first line conductor of each of the plurality of electric lines and the second line conductor of each of the plurality of electric lines.

4. The inverter, according to claim 3, wherein the inverter comprises a second passive filter electrically coupled with the DC input port, the common node, and the second line conductor of each of the plurality of electric lines.

5. The inverter, according to claim 1, wherein said electric lines form interleaved DC input channels operatively coupled with the DC input port.

6. A photovoltaic apparatus comprising the inverter according to claim 1.

7. The inverter of claim 1 wherein the first voltage polarity is positive and the second voltage polarity is negative.

8. The inverter of claim 1 wherein the first voltage polarity is negative and the second voltage polarity is positive.

9. A choke filter for a DC electric bus of a photovoltaic apparatus, said DC electric bus having a plurality of electric lines forming corresponding DC input channels for an inverter of said photovoltaic apparatus, each electric line comprising a first line conductor having a first voltage polarity and a second line conductor having a second voltage polarity, wherein it comprises a single magnetic circuit and a plurality of choke windings enchained with said magnetic circuit, each choke winding including a first terminal coupled with the first line conductor of one of the plurality of electric lines, and a second terminal coupled to a common node, the common node having the same voltage polarity as each of the choke windings.

10. A photovoltaic apparatus wherein it comprises the choke filter, according to claim 9.

* * * * *